(12) United States Patent
Luo

(10) Patent No.: US 6,757,388 B2
(45) Date of Patent: Jun. 29, 2004

(54) ALPHABETIC TELEPHONE

(76) Inventor: Ching-Hsing Luo, Cheng Kung University, Tainan (TW), 70101

( * ) Notice: Subject to any disclaimer, the term of this patent is extended or adjusted under 35 U.S.C. 154(b) by 483 days.

(21) Appl. No.: 09/942,726

(22) Filed: Aug. 31, 2001

(65) Prior Publication Data

US 2003/0048897 A1 Mar. 13, 2003

(51) Int. Cl.[7] .................................................. H04M 1/00
(52) U.S. Cl. ............................. 379/433.07; 379/433.06; 379/368
(58) Field of Search ........................... 379/368, 433.06, 379/433.07; 200/5 A, 5 D

(56) References Cited

U.S. PATENT DOCUMENTS 6,563,923 B2 * 5/2003 Otsuka ....................... 379/368

* cited by examiner

*Primary Examiner*—Jack Chiang

(74) *Attorney, Agent, or Firm*—Peter Gibson

(57) ABSTRACT

A full range of alphanumeric characters is obtained with two different modes upon a twelve key telephone keypad. Numerics are obtained with single keystrokes in one mode and English alphabetics obtained with single and paired keystrokes in another mode. Memory is provided in which a plurality of telephone numbers can be stored, organized, identified and retrieved by a combination of alphanumeric characters including names and abbreviations. A visual display facilitates storing and retrieval of any telephone number. Alphanumeric messages can be transmitted to, and received from, other remote telephonic devices. Any language is encompassed and use of two languages on one keypad is facilitated. Characters in one language such as English are obtained as above in one mode and characters of another language possessing considerably more characters, e.g. Chinese or Japanese, are obtained in another mode with use of sequential key pairs in which the order of the sequence determines which of two different characters is obtained. Both sets of alphabetic characters are printed upon the keypad. Single and dual keystrokes are differentiated with an interval threshold which can utilize a threshold algorithm for customized interval threshold settings.

29 Claims, 6 Drawing Sheets

Phone pad

Function key

ALPHABETIC TELEPHONE

BACKGROUND OF THE INVENTION

I. Field of the Invention

The present subject matter relates: generally to telephones possessing dynamic memory repertory call signal generation (379/356); more particularly to such telephones further capable of transmitting digital message signals over a telephone line and having a visual display (379/93.17); and most particularly to such telephones (379/356 & 93.17) further possessing the capability of alphabetic character generation in addition to numeric character generation with a conventional, twelve key, keypad augmented by four additional function keys.

II. Prior Art

Telephones are considered to be well known devices which permit spoken conversation between remotely located individual persons utilizing conversion of voice, i.e. audio waves, to electricity and vice versa. Each conversation relies upon a 'line' connection between at least two telephonic devices each identified by a 'telephone number' or code. Initiation of a 'telephone call' hence requires entrance of the code identifying the device desired and a keypad possessing twelve keys is typically provided on each telephone for this purpose. Keypads are considered to be well known particularly for generation of numeric characters, or numerics for sake of brevity, upon a variety of devices including calculators and telephones.

It is noted that prior to the prevalence of digital technology telephones typically were equipped with dials possessing ten different radially spaced apertures determining the length of an analog tone corresponding to the ten digits 0–9. The typical modern twelve key keypad commonly found on digital telephones today is recognized as a descendent of this previous analog dial and the source of the term 'dial tone' which is heard when a telephone is activated for use and which indicates that a serviceable connection to a public branch exchange (PBX) has been activated and that entrance of a valid telephone number will 'ring' another telephonic device identified by that number if operably connected to that or another PBX.

The standard twelve key telephone keypad has three columns and four rows with the uppermost or first row comprised of the numeric digits 1–3, the second row comprised of the numeric digits 4–6, the third 7–9 and the last or bottom row '*', '0' & '#'. Each of these twelve characters is typically printed upon one key with the numbers 2–9 further having three English alphabetic characters, i.e. letters, printed upon or proximate the key concerned beginning with 'ABC' below the '2' key and ending with 'WXY' below the '9' key wherein the letters 'Q' and 'Z' are omitted and the '0' key is reserved for 'operator'.

The '*' and '#' keys or asterisk and number keys are more commonly known as 'star' and 'pound' keys. Star is used as a commonly recognized symbol and pound, a quaint designation of the old English and only currently American unit of weight, is utilized to distinguish this key from the actual numbers represented by other keys. The original purpose of the 'star' and 'pound' keys is unknown to the present author but for present purposes this is unimportant. Each of these keys is now utilized as a 'function' key in that each generates a digital 'tone' or signal which can be interpreted in any variety of ways by any system. '*' and '#' keys are, in other words, wild cards which can signify anything desired and which are generally recognized as being useful for signalling the termination of a code comprised of a series of numeric signals generated by the other keys.

The alphabetic characters associated with the numerics 2–9 also derive from a now archaic system from the earlier analog age whereby the 'exchange' comprised of the first three numbers of the old, local, seven digit United States system was selected on the basis of the name of a locality. For any given city or other essentially regional PBX possessing and identified by the same 'area code' or the first three digits of the still current, though its days are numbered, ten digit number system utilized in the United States, individual localities or neighborhoods were commonly known by names reflected in the 'exchange' number. These alphabetic characters where hence intended as an aid in remembering multiple digit telephone numbers, and are today used by many as an aid in remembering personal identification numbers (PINs). These alphabetic characters were intended to support the use of mnemonics: to assist people in remembering numbers by association with names which were and are still today considered more easily remembered than numbers.

It is for this reason that, even today in the 'digital age', manually inscribed directories in which names are alphabetically organized are considered a commonplace. 'Electronic organizers' with dynamic memory, visual displays, and alphanumeric keyboards are also a commonplace but the fact remains that the device, which for present purposes is the digital equivalent to a manually inscribed directory or address book, is another device which is separate from a telephone. And it is recognized that the presently concerned subject matter requires certain attributes of an electronic organizer including dynamic memory for variable input of names and telephone numbers in a directory, a visual display, and a key input device capable of generating alphabetic and numeric characters.

The electronic organizer, however, possesses an alphanumeric keypad with a greater number of keys than is generally considered desirable on a telephone. Portable 'laptop' computers are also known which further possess the capability of sending digital messages over telephone lines, even through a radio frequency (RF) connection in the manner of a portable RF telephone. However, a telephone, in contrast to electronic organizers or laptop computers, primarily supports voice derived signal communication in transmission and reception with telephonic addresses being obtained with a numeric series code, i.e. a 'telephone number', and does not readily accommodate an alphanumeric keyboard owing to physical dimensional restrictions.

A conventional telephonic keypad, as discussed above, has only twelve keys. Modern 'cellular' RF telephones, wherein the 'cell' is the area encompassed by an RF transponder, are commonly equipped with more than twelve keys but invariably still possess a basic twelve key keypad possessing the numerics 0–9, and the two symbols '#', and '*' which function in the manner expected in telephonic communications digital or otherwise. Additional keys are provided for power state, commencing transmission, commencing reception, and other functions essential to operation. A visual display of the 'telephone number' being entered for transmission is also a common attribute of portable RF telephones and this feature further readily accommodates visual display of an incoming 'telephone number' prior to 'picking up' or commencing reception. The conventional twelve key numeric keypad, however, is inherently unsuited to alphabetic character generation as the alphabetic characters thereupon were only intended in support of mnemonics.

As mentioned earlier the conventional twelve key telephonic keypad omits the letters 'Q' and 'Z'. It is considered that even with correction of this defect with addition of these characters to the '1' key, for example, with a mode change accomplished by stroking the '*' key and entrance with stroking of the '#' key the fact that three alphabetic characters are associated with most of the keys requires entrance of three separate strokes of each key to generate the third character. This arrangement, moreover, is considered typical of current alphabetic character generation with a conventional twelve key keypad. Aside from any other disadvantage presented by the conventional telephonic keypad using the basic alphabetic designation thereupon three separate keystrokes for the generation of a single alphabetic character is simply considered excessively awkward in operation.

In deference to this inherent difficulty current portable RF telephones with a screen for visual display neither provide for alphabetic character generation nor for a directory but simply use the screen for either displaying the number entered for transmission or incoming reception, as is commonly known, or for navigating a simple decision tree or 'branch' type menu such as disclosed by U.S. Pat. No. 6,021,193 issued Feb. 1, 2000 and assigned to Nokia Mobile Phones Limited, Espoo, Finland.

Another approach involves selection of alphabetic characters from a visual display screen using a cursor operated, for example, by a 'depressible trackball' as in U.S. Pat. No. 5,841,849 issued Nov. 24, 1998 and assigned to Lucent Technologies Inc. of Murray Hill, N.J. Aside from other apparent difficulties to this approach including the expense of the screen required to depict both the alphabet and other desired symbols in addition to the message created therewith for which two large screens are provided in U.S. Pat. No. 5,841,849, the selection of alphabetic characters from a screen is considered excessively awkward and inherently slower than efficient use of a keypad, even if many keys require three strokes to generate a number of alphabetic characters.

Many other telephonic systems are known which restrict their repertory to previous telephone numbers either called or received. These calls can be tallied and assigned to numbers in accordance with frequency and assigned to specific memory registers for direct selection, such in U.S. Pat. No. 6,249,579 issued Jun. 19, 2001 to Lucent Technologies Inc., and manipulated in other ways which do not require alphabetic character generation.

Previously received telephone numbers can commonly be reviewed with a feature known as 'caller ID' which can carry a name too but has no possible means of alphabetic character generation by the telephone. Caller ID typically presents a series listing of telephone numbers and names if available in chronologically reverse order beginning with the last call received. The memory is limited and the oldest telephone number is deleted to make room for the latest. It is, moreover, considered tedious to review even half of the listing concerned even if successful. In the attempt to more quickly locate a telephone number previously received remembrance of the caller's location by "the various prefixes specific to different telephone networks and different countries" is used in searching the call history in U.S. Pat. No. 6,052,451 issued Apr. 18, 2000 and assigned to Acatel of Paris, France.

The previously received telephone numbers and names made available through 'caller ID', known as a 'phone book' in U.S. Pat. No. 6,128,381 issued Oct. 3, 2000 and assigned to Telefonaktiebolaget LM Ericsson of Stockholm, Sweden, may be selected for storage in memory registers and, as a second step, one or more entries selected for various operations including addition, deletion and calling singly or in conference. All of these features, however, in relying upon previous received telephone numbers and lacking the capability of generating alphabetic characters are considered to possess a fundamental restriction with regard to obtaining a telephone number quickly for a particular party: the data available is that provided by the received calls and this is quite often exclusive of a name. International calls do not yield a name and many parties elect to have their names removed from the information provided by caller I.D.

III. Statement of Need

Because telephone address directories based upon caller ID history rely upon the received information which is often lacking a name, and because the names provided are often longer than desired for entrance quickly, it is considered desirable to have the ability of creating a telephone directory with the active generation of alphabetic characters in addition to numerics. And because the generation of alphabetic characters with the use of three keystrokes is considered excessively awkward and the provision of a full keyboard enabling alphabetic character generation with single keystrokes is considered dimensionally impractical it is considered that a need therefore exists for a telephone possessing a keypad capable of generating a full range of numeric and alphabetic characters which requires no more than two keystrokes for the generation of any character and which possesses a screen for visual display of entries in a telephone address directory each retrievable by the entrance of one or more alphabetic characters including a short first name such as 'Jeb', or an abbreviation of the name associated with the telephone number concerned, or even just a single initial such as 'W', which will enable anyone to quickly retrieve and automatically dial telephone numbers of other parties using alphabetic monikers of the owner's choosing.

SUMMARY OF THE INVENTION

I. Objects of the Invention

A first primary object of the present invention is the provision of a telephone possessing a screen for visual display of entries in a telephone address directory each retrievable by the entrance of one or more alphabetic characters each generated with less than three keystrokes utilizing a twelve key keypad by which numeric telephone addresses may also be entered.

A second primary object of the present invention is the provision of a telephone possessing a screen for visual display of messages comprised of alphabetic characters each generated with less than three keystrokes utilizing a twelve key keypad by which numeric telephone addresses may also be entered.

A third primary object of the present invention is the provision of a telephone possessing a screen for visual display of alphabetic characters each generated with less than three keystrokes utilizing a twelve key keypad by which numeric telephone addresses may also be entered wherein said alphabetic characters are taken from one of two different alphabetic character sets facilitating usage in more than one language.

An auxiliary object of the present invention is the provision of telephone possessing a screen for visual display of alphabetic characters each generated with less than three keystrokes utilizing a twelve key keypad by which numeric telephone addresses may also be entered with a simple, readily understood, character generation system.

Another auxiliary object of the present invention is the provision of telephone possessing a screen for visual display of alphabetic characters each generated with less than three keystrokes utilizing a keypad capable of generating alphabetic and numeric characters with a simple, readily understood, character generation system in which each character is visibly located upon the keypad in a position indicating the keystroke sequence resulting in generation of that character.

Further objects and advantages of the present invention may be appreciated with an understanding of the principles relating to said invention.

II. Principles Relating to the Present Invention

In achievement of the above objects it is suggested that a telephone with a visual display screen and microprocessor based memory in addition to the typical capabilities of a portable, wireless, RF telephone be equipped with a twelve key keypad by which numerics are generated with a single keystroke in one mode and alphabetic characters are generated with either a single keystroke or two coordinated keystrokes in another mode. And it is suggested that a smaller number of additional function keys be provided for various functions including this numeric/alphabetic character mode change. It is recognized that the '*' and '#' keys can be utilized as function keys in a second mode while retaining their usual signal function in the numeric mode and specifically suggested that these two keys be utilized as cursor movement keys for visual display upon the screen.

The alphabetic characters are depicted upon the keypad indicating by location the keystrokes required for generation. For one or two strokes of the same key the character generated is preferably depicted upon the key. A single character depicted between two keys is generated by stroking both keys separately in any order, i.e. in either direction. Either of a pair of characters depicted between two keys is generated with a directional sequence of two separate strokes determined by relative proximity of each key to each character. It is specifically suggested that relative proximity to one key indicate a keystroke sequence beginning with that key but the reverse or corollary wherein relative proximity to a key indicates a keystroke sequence ending with that key is considered functionally, if perhaps not quite as intuitively, equivalent in operation. It is also suggested that adaptive recognition be utilized to set time intervals between keystrokes as thresholds distinguishing single from either double or paired keystrokes which are adaptive to the habitual speed of the owner of the telephone.

Ten of the twelve keys of a typical telephone keypad in an alphabetic character generation mode can produce all twenty-six English alphabetic characters along with three more symbols with ten single and nineteen paired keystrokes made between vertically, horizontally, and diagonally adjacent keys in either order. The '*' and '#' keys can be reserved for a function such as cursor movement including scrolling through a telephone address directory or 'phonebook'. A space character and punctuation symbols along with a backspace or delete function are also suggested.

One guiding principle relating to the present invention is the minimization of the number of keystrokes required to recover and enter a numeric code 'telephone number', especially one which is not remembered, except by name of the person associated with the same. It is hence considered desirable to be able to enter only the first name or a few letters of someone's last name, or their initials, in order to retrieve a numeric code 'telephone' number associated with that name from memory and simply press a 'send' key to 'dial' that numeric code 'telephone number'. This requires the ability to input into memory the name or other alphabetic character designation along with the numeric code 'telephone number' associated with that alphabetic character designation. And it is desirable to be able to select from a memory listing which can be scrolled through with the use of at least one key operating a cursor.

An opposed guiding principle relating to the present invention is the maximization of the versatility of a telephone possessing a keypad capable of generating a full range of alphabetic and a useful range of other symbolic characters sufficient for the creation of textual messages for transmission as well as reception and display of similar textual messages. And a corollary guiding principle relating to the present invention is the maximization of the versatility of a telephone possessing a keypad capable of generating a fill range of more than one set of alphabetic characters thereby facilitating operation in more than one language.

It is specifically suggested that operation in English as described above be available in one mode of operation and that a language possessing considerably more alphabetic characters be available in a second mode of operation which differs from the mode outlined above. Both Chinese, with forty-two, and Japanese, with forty-six characters, are specifically addressed. Either may be encompassed as an alternative supplanting, or additionally available to, the mode of English character generation outlined above. In the appropriate mode alphabetic characters of a language possessing considerably more characters than the English language may be obtained with ten keys of a typical twelve key telephonic keypad, while again reserving the '*' and '#' keys for cursor control or another function, by utilizing sequentially ordered keystroke pairs wherein the order in which two adjacent keys are stroked as a pair determines which of two different characters are generated.

Detailed discussion of preferred configuration and operation of an embodiment of the principles relating to the present invention may be found below and further benefits and advantages of an embodiment in accordance with said principles discerned in a reading of the same discussion especially if conducted with reference to the drawings attached hereto and briefly described immediately below.

NOMENCLATURE

Figure 1:
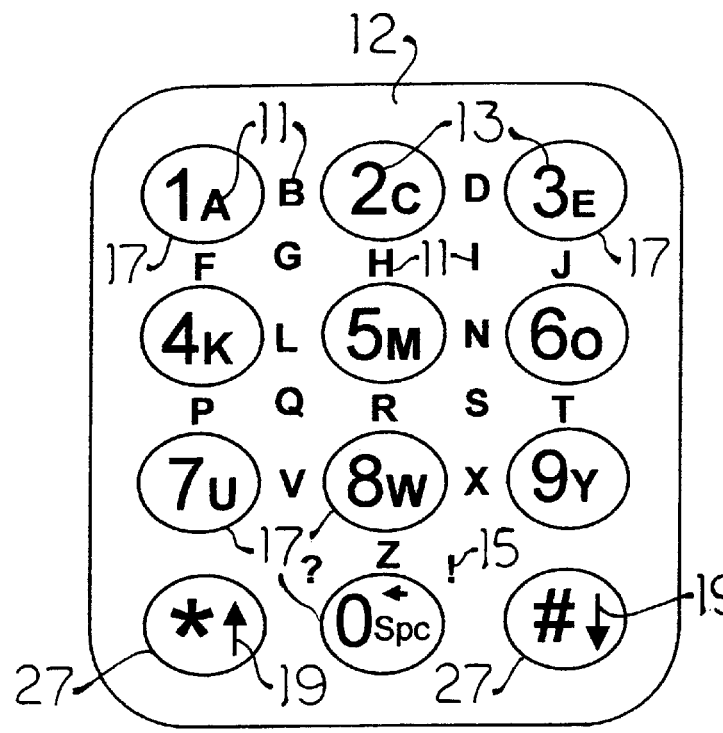
FIG. 1 is a graphic representation of a keypad for use by a telephone in accordance with the principles relating to the present invention possessing twelve keys in standard configuration with visual depictions of the numerics 0–9 and '*' and '#' upon the keys and English alphabetic characters located upon and between the keys.

11 alphabetic characters
12 keypad
13 numerics
15 punctuation marks
17 numeric keys
19 directional symbol
21 Keystroke Encoder
22 Translator
23 Threshold Recognizer
25 symbols
27 '*' & '#' function keys
29 cursor
30 'Call/Enter' function key
31 'Char' function key
32 'Esc' function key
33 'PhoneBook' function key
35 LCD screen
36 address directory
37 names

DETAILED DESCRIPTION OF THE PREFERRED EMBODIMENT

FIG. 1 shows one configuration for arranging English alphabetic characters 11 upon a twelve key telephonic keypad 12 for an alphabetic telephone in accordance with the principles relating to the present invention. Location image technique is used to facilitate memory. For instance, the alphabetic character 11 'A' is located upon the numeric key 17 bearing the numeric 13 '1' and one stroke of the same will generate the alphabetic character 11 'A' in the character mode. In the number mode, it is just a regular telephone keypad for inputting the numerics 13 '0'–'9'. Therefore, in the character mode, 'A', 'C', 'E', 'K', 'M', 'O', 'U', 'W', and 'Y' can be obtained with one stroke and the other alphabetic characters 11 are obtained with two strokes.

To effect a two stroke alphabetic character 11 one must simply observe the location of the alphabetic character 11 upon the keypad 12 in relation to the numeric keys 17. On the keypad 12 depicted in FIG. 1, for example, the alphabetic character 11 'B' is obtained by stroking the numeric keys 17 bearing the numerics 13 '1' & '2' in any order as the alphabetic character 11 'B' is, alone, located therebetween. The alphabetic character 11 'N' is similarly obtained by stroking the keys 17 bearing the numerics 13 '5' & '6' in either order. The alphabetic character 11 'H' is similarly obtained by stroking the numeric keys 17 bearing the numerics 13 '2' & '5' in either order. The alphabetic characters 11 'G', 'I', 'Q', and 'S' are located between two different diagonally adjacent pairs of numeric keys 17 and each is obtained by stroking either pair. The alphabetic character 11 'G', for example, is obtained by stroking the pair of numeric keys 17 bearing the numerics 13 '1' & '5' or the pair of numeric keys 17 bearing the numerics 13 '2' & '4'. The punctuation marks 15 '?' and '!' are, respectively, obtained by striking the pairs of numeric keys 17 bearing the numerics 13 '7' & '0' and '9' & '0'. It is preferred that the '*' & '#' function keys 27 not be utilized in the generation of alphabetic characters 11 to reserve use of these function keys 27 for a function such as cursor control as clearly depicted by the two vertical 'arrows', or directional symbols 19, pointing in opposed directions: upward and downward. The numeric key 17 bearing the numeric 13 '0' is preferably used, as indicated, for generating a space with one key stroke and effecting a backspace if stroked twice.

With an arrangement of numeric keys 17 in accordance with the principles relating to the present invention an operator can memorize the location of each alphabetic character 11 in relation to the numerics 13 which are conventionally arranged, and hence already known by memory, and operate this single, conventionally arranged twelve key telephonic keypad 12, very efficiently without requiring more than two keystrokes for the generation of any numeric 13 or English alphabetic character 11. And although it is preferred to utilize a character mode this is unnecessary, as demonstrated by an alternative use of the keypad 12 depicted in FIG. 1 wherein the numerics 13 '0'–'9' are still obtained with single keystrokes of the same numeric keys 17 and the alphabetic characters 11 'A', 'C', 'E', 'K', 'M', 'O', 'U', 'W', and 'Y' are obtained with double keystrokes of the numeric key 17 bearing that English alphabetic character 11. The other alphabetic characters 11 are obtained in the same manner as described above with paired keystrokes of adjacent numeric keys 17.

It is, moreover, necessary to distinguish between single and dual, i.e. paired or double keystrokes, and a time threshold between strokes is utilized wherein a predetermined amount of time is utilized for determining whether successive keystrokes are single or not with single keystrokes being separated by an interval exceeding the threshold and dual keystrokes effectively linked by an interval failing to exceed the threshold. It is preferred, moreover, that this time threshold be predetermined in an adaptive manner which adjusts to the characteristics of the operator with regard to pausing between single and dual keystrokes.

Figure 2:
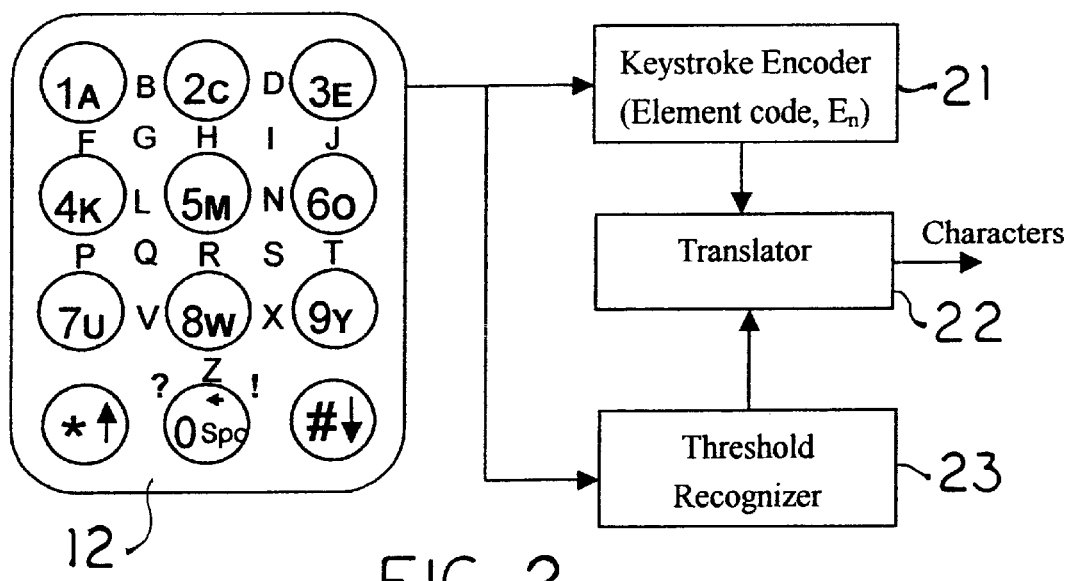
FIG. 2 is a block representation of an algorithm for distinguishing single from dual keystrokes in processing of a signal from a keypad such as that depicted in FIG. 1 for use by a telephone in accordance with the principles relating to the present invention.

Recognition of single and dual keystrokes is represented in FIG. 2. A Translator 22 accepts a time threshold from a Threshold Recognizer 23 as the basis for determining whether the interval in time between successive keystrokes received by the Keystroke Encoder 21 defines a single or dual keystroke. With an appropriate recognition algorithm installed in the Threshold Recognizer 23 the time threshold is set as either static, with a fixed algorithm, or adaptive, with an adaptive algorithm which automatically adjusts to the pausing used by the operator. Many techniques are known for providing this capability including least mean squared (LMS) adaptive signal processing, fuzzy logic rules, neural net, and neuro-fuzzy as currently practiced. These techniques adjust a predetermined time threshold in response to the preceding pattern of an operator's keystrokes characterized by the average or modal or most likely amount of time, i.e. interval, utilized by the operator between single keystrokes, i.e. a pause, as opposed to the typical interval between dual, linked, keystrokes. An operator may, for example, strike the same numeric key 17 in a double keystroke most quickly and strike vertically or horizontally adjacent numeric keys 17 in a paired keystroke almost as quickly but strike diagonally adjacent numeric keys 17 much more slowly, closer in time actually to the average or typical interval between single keystrokes than to the double keystrokes. The simple mean average for single as opposed to dual keystrokes in this example is considered problematic but recognition of the modal characteristics of the operator inclusive of the intervals between various combinations of keys 17 stroked in differing types of alphabetic character 11 generation with an appropriate adaptive algorithm in the Threshold Recognizer 23 readily overcomes potential problems of this kind.

Figure 3:
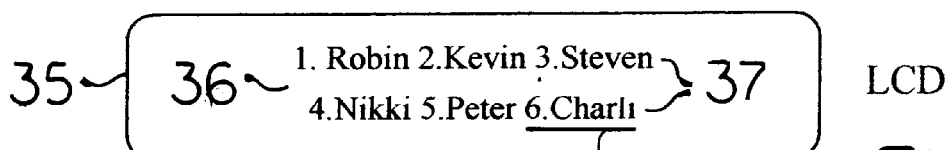
FIG. 3 is a layout representation of an LCD screen, keypad as depicted in FIG. 1, and function keys for use by a telephone in accordance with the principles relating to the present invention with part of an alphabetic character name address directory visually displayed upon the screen.
Figure 3:
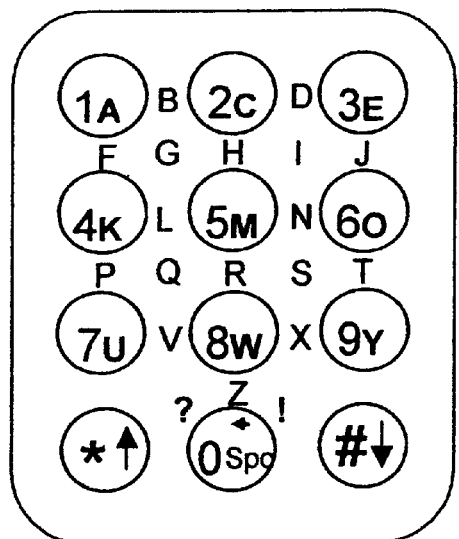
Figure 3:
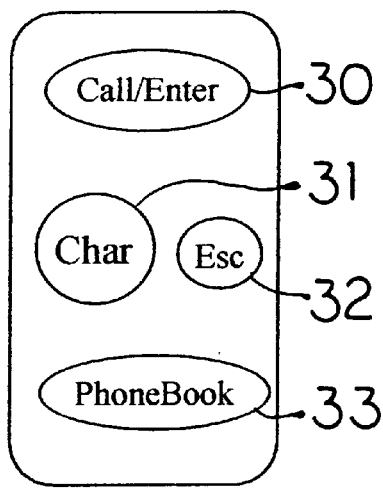

FIG. 3 depicts a representative layout of a Phone pad, i.e. keypad 12, function key(s) 30, 31, 32, 33, and LCD screen 35 for an alphabetic telephone in accordance with the principles relating to the present invention. The specific layout of these component is unimportant. The function keys 30–33 might be dispersed but are preferably arranged together though this might be under or above the keypad 12 which might be vertically aligned with the LCD screen 35 preferably, and conventionally, located at top to prevent obscuring of the same with one's hand during operation.

Figure 4:
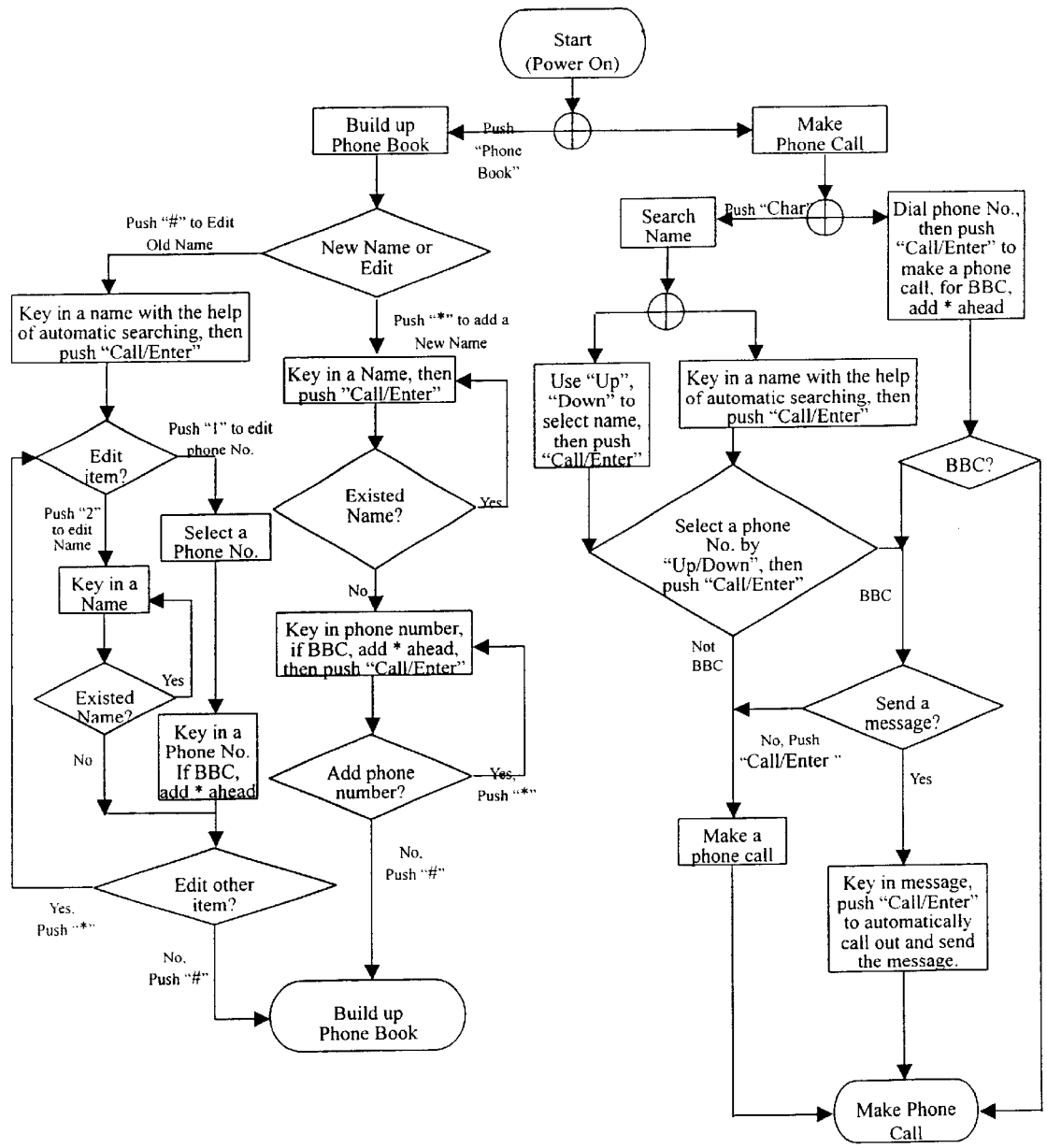
FIG. 4 is a flow chart representation of a control system logic implementation supporting building of a 'PhoneBook', i.e. address directory as represented in FIG. 3, 'Search Name', i.e. repertory dialing, and direct dialing for a telephone in accordance with the principles relating to the present invention.

FIG. 4 depicts a representative flow chart for control of an alphabetic telephone in accordance with the principles relating to the present invention possessing the layout depicted in FIG. 3. Stroking the 'Call/Enter' function key 30 activates the telephonic line connection initiating transmission of a numeric telephone address or alphabetic message, preferably in selection of either as displayed on an LCD screen 35. An English alphabetic message can be transmitted in a 'BBCall' by one Taiwanese telephone system and is used to represent any such telephonic capability in FIG. 4 which, utilizing a keypad 12 such at that depicted in FIGS. 1–3, the function keys 30–33 and LCD screen 35 depicted in FIG. 3, in conjunction with appropriate dynamic memory which is not depicted, schematically represents an appropriate logic structure for processing by a microprocessor control system including dynamic memory for both the 'PhoneBook' or telephone address directory 36 represented on the LCD screen 35 in FIG. 3 or an alphabetic message.

It is preferred that entrance of a telephone number by name 37 be facilitated such that stroking of the 'Char' key 31 puts the system into a name searching mode which responds to the input of one or more alphabetic characters 11 with an alphabetically related portion of the address directory 36 which, as represented in FIG. 3, is seen by a cursor 29 underlining one of the names 37 in response to the entry of one or more alphabetic characters 11. The portion of the address directory 36 shown on an LCD screen 35 can consist of a single name 37 and can also visually display the telephone number to be called by stroking the 'Call/Enter' key 30 and which can be moved by stroking an '*' or '#' function key 27 on the keypad 12 depicted in FIGS. 1–3 utilized for cursor control as indicated by the direction symbols 19 thereupon.

As represented in FIG. 4, it is preferred that an address directory 36, or 'Phone Book', be modified, or 'Built up' by first stroking the 'PhoneBook' key function 33 and stroking either the '*' or '#' function keys 27 to, respectively, add a new or modify an existing name 37. After this selection the '*' and '#' function keys revert to functioning as cursor 29 control as indicated by the directional symbols 19 thereupon and both numerics 13 and alphabetic characters 11 are inputted in accordance with the appropriate mode selected by stroking the 'Esc' function key 32. In the numeric mode the '*' function key 27 preferably enables that symbol to be generated and, when used in conjunction with, such as immediately ahead of, a telephone number signifies to the system that a BBCall, i.e. a digital alphabetic message, is to be made when the name 37 associated with this telephone number is selected from the address directory 36. This results in the system automatically executing an appropriate procedure whereby the operator is provided with a prompt for entrance of an alphabetic character 11 message, as further shown in FIG. 4. This operation clearly requires a correlation between key sequence input and character generated or obtained thereby. An example of such a correlation is given below in Table 1 wherein the numerics 13 are listed as 'Digits' and alphabetic characters 11 and a few punctuation marks 15 are listed under 'Alpha' which are each correlated with sequentially paired keystrokes of the numeric keys 17 as identified in the dual numeric digit given in this table as the 'Code':

TABLE 1

| Digit | Code |
| --- | --- |
| 0 | 00 |
| 1 | 10 |
| 2 | 20 |
| 3 | 30 |
| 4 | 40 |
| 5 | 50 |
| 6 | 60 |
| 7 | 70 |
| 8 | 80 |
| 9 | 90 |

| Alpha. | Code |
| --- | --- |
| A | 21 |
| B | 22 |
| C | 23 |
| D | 31 |
| E | 32 |
| F | 33 |
| G | 41 |
| H | 42 |
| I | 43 |
| J | 51 |
| K | 52 |
| L | 53 |
| M | 61 |
| N | 62 |
| O | 63 |
| P | 71 |
| Q | 02 |
| R | 72 |
| S | 73 |
| T | 81 |
| U | 82 |

TABLE 1-continued

| | |
|---|---|
| V | 83 |
| W | 91 |
| X | 92 |
| Y | 93 |
| Z | 03 |
| Spc. | 01 |
| -- | 24 |
| ( | 25 |
| ) | 26 |

In accordance with the purely exemplary correlation between characters and key stroke sequence given above in Table 1 the message 'I LOVE YOU', for example, would be rendered with the following keystroke sequence: #*9 43 01 53 63 83 32 01 93 63 82 # wherein '#' initiates and finishes the message.

Figure 5:
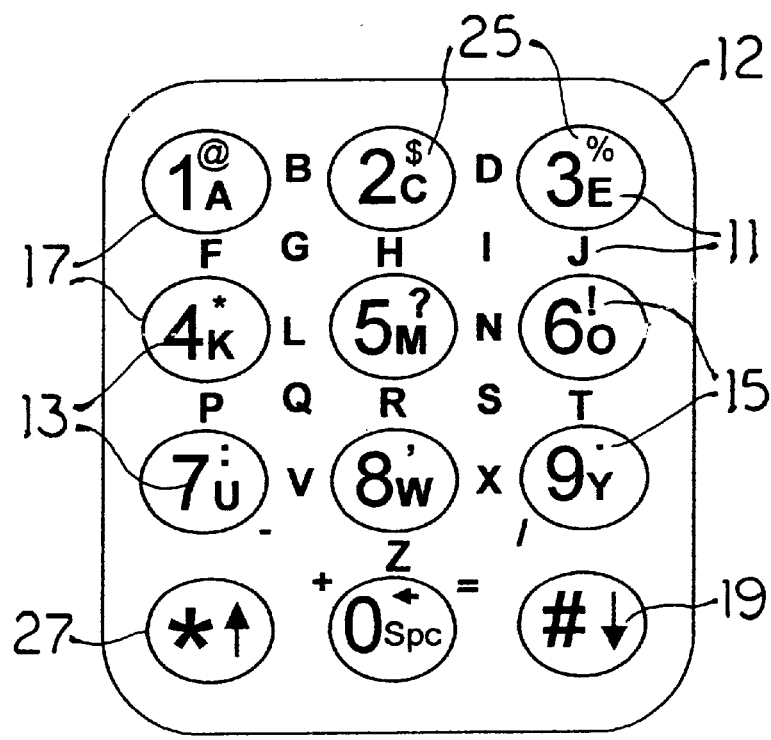
FIG. 5 is a graphic representation of a keypad for use by a telephone in accordance with the principles relating to the present invention possessing twelve keys in standard configuration with visual depictions of the numerics 0–9 and '*' and '#' upon the keys and English alphabetic characters located upon and between the keys along with a plurality of punctuation marks and symbols.

An alternative keypad 12 is depicted in FIG. 5 which, in comparison with the keypad 12 depicted FIGS. 1–3, possesses additional punctuation marks 15 and other symbols 25 upon the numeric keys 17 which are obtained by double stroking that numeric key 17 which operation requires us of both numeric and alphabetic modes in contrast to the keypad depicted in FIGS. 1–3. The symbols 25 '@', '$', '%', and '*' are seen in FIG. 5 to be obtained, i.e. generated, by double stroking of the numeric keys 17 bearing the numerics 13 '1', '2', '3', and '4' in a character mode while single strokes of these same numeric keys 17 in a character mode generate 'A', 'C', 'E' and 'K'. The punctuation marks 15 on the numeric keys 17 bearing the numerics 13 '6'–'9' are similarly obtained as are the alphabetic characters 11 seen thereupon.

The two pairs of symbols 25, '−' & '+' and '/' & '=' found, respectively, between the numeric keys 17 bearing the numerics 13 '7' & '0' and '9' & '0' in FIG. 5 are obtained or generated in a manner which is different to previous discussion in detail above. Each of these four symbols 25, '−' & '+' and '/' & '=', are obtained by sequentially paired keystrokes in which the order of the two numeric keys 17 stroked determined which of the pair of symbols 25 is generated. The location of the symbol 25 determines the sequence of the paired keystroke utilized and preferably indicates by proximity the first numeric key 17 stroked of the pair. In this manner the slash symbol 25 '/' is obtained with stroking the numeric keys 17 bearing the numerics '9' first and '0' second while the equals symbol '=' is obtained with the reverse.

Figure 6:
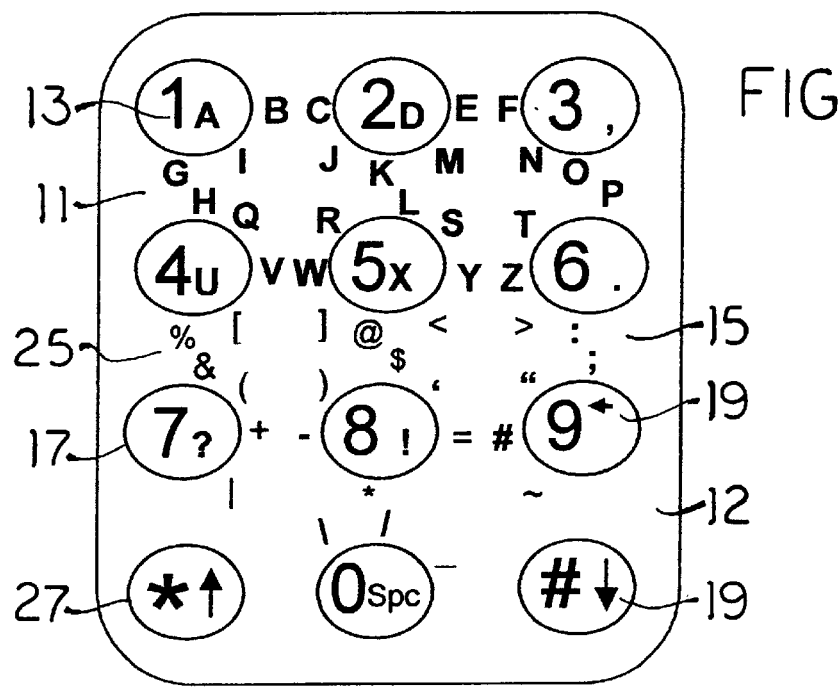
FIG. 6 is a graphic representation of a keypad for use by a telephone in accordance with the principles relating to the present invention possessing twelve keys in standard configuration with visual depictions of the numerics 0–9 and '*' and '#' upon the keys and English alphabetic characters and a large plurality of punctuation marks and symbols located singly upon, and in sequential pairs between, the keys.

The use of sequentially paired keystrokes is expanded in the keypad 12 depicted in FIG. 6 to most English alphabetic characters 11 thereby accommodating a greater number of punctuation marks 15 and other symbols 25 as seen therein upon the same basic keypad 12 familiar to everyone. The upper area of the keypad 12 generates alphabetic characters 11; the lower area punctuation marks 15 and other symbols 25. Numerics 13 are obtained with single keystrokes in a numeric mode. The alphabetic characters 'A', 'D', 'U', and 'X', and punctuation marks 15 ',', '.', '?', '!' or comma, period, question mark, exclamation mark, and a backspace indicated by the directional symbol 19 of an arrow pointing to the left or backwards, are obtained with single keystrokes in a character mode.

Most of the alphabetic characters 11 are obtained with sequentially paired keystrokes. 'E' is obtained by stroking the numeric keys 17 bearing the numeric 13 '2' first and the numeric 13 '3' second while the reverse keystrokes in a pair obtain 'F'. Similarly, the symbol '<' is obtained by the sequentially paired keystrokes of the numeric keys 17 bearing the numerics 13 '5' & '9' while the reverse, '9' & '5' obtains a quotation mark. The location of each alphabetic character 11, punctuation mark 15, or symbol 25 between two numeric keys 17 more proximate one than the other is again utilized in the same preferred manner whereby the more proximate numeric key 17 is struck first.

Figure 7:
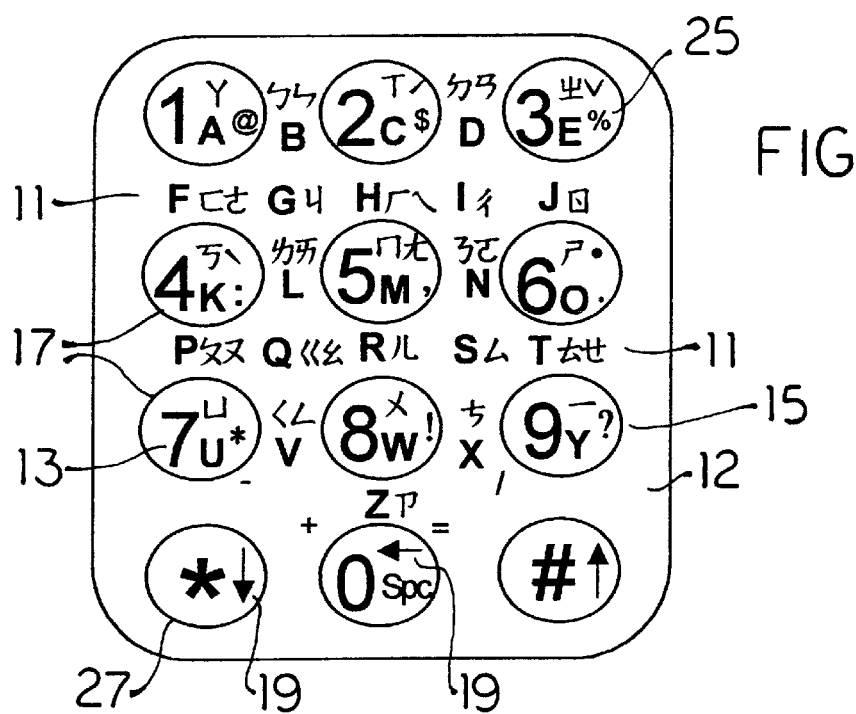
FIG. 7 is a graphic representation of a keypad for use by a telephone in accordance with the principles relating to the present invention possessing twelve keys in standard configuration with visual depictions of the numerics 0–9 and '*' and '#' upon the keys with English alphabetic characters, punctuation marks, and symbols located singly upon and between the keys and associated with groups of single and paired Chinese alphabetic characters upon and between the keys.

FIG. 7 depicts a telephonic keypad 12 of conventional configuration with all keys 17, 27 operable in a numeric mode in conventional manner with single keystrokes. In a character mode the '*' and '#' function keys 27 operate in cursor 29 control, as indicated by the upward and downward directional symbols 1, which directions are reversed with respect to the previous depictions to indicate that the assignment is largely arbitrary and that forward and backward cursor 29 control may also be provided. A backward pointing arrow, unless opposed by, or juxtaposed with, a forward pointing arrow, is also commonly understood to indicate a backspace which enables correction of the most recent alphabetic entrance. This is preferably obtained, as indicated, by a double strike of the numeric key 17 bearing the numeric 13 '0' and that directional symbol 19 above 'Spc' which indicates that a single stroke of this numeric key 17 in a character mode generates a space.

The keypad 12 depicted in FIG. 7 is hence, in many respects, similar to previously discussed keypads 12 for an alphabetic telephone in accordance with the principles relating to the present invention and its operation consistent with the same. In addition to the English alphabetic characters 11, which are seen therein to be located upon and equally spaced between numeric keys 17, there are seen the forty-two Chinese alphabetic characters 11 located either singly or in pairs between numeric keys 17 alongside an English alphabetic character 11 in addition to being located upon the same either singly or in pairs, again located alongside a particular English alphabetic character 11. The forty-two Chinese alphabetic characters 11 have been arranged into twenty-six groups of one or two characters 11 in correspondence with similar phonetics or appearance. Every alphabetic character 11, English or Chinese, which is seen between two numeric keys 17 is obtained with a paired keystroke of those two numeric keys 17 in either order. The selection of which Chinese character 11 from a pair is preferably determined by an appropriate algorithm recognizing Chinese grammar and previous entries.

Figure 8:
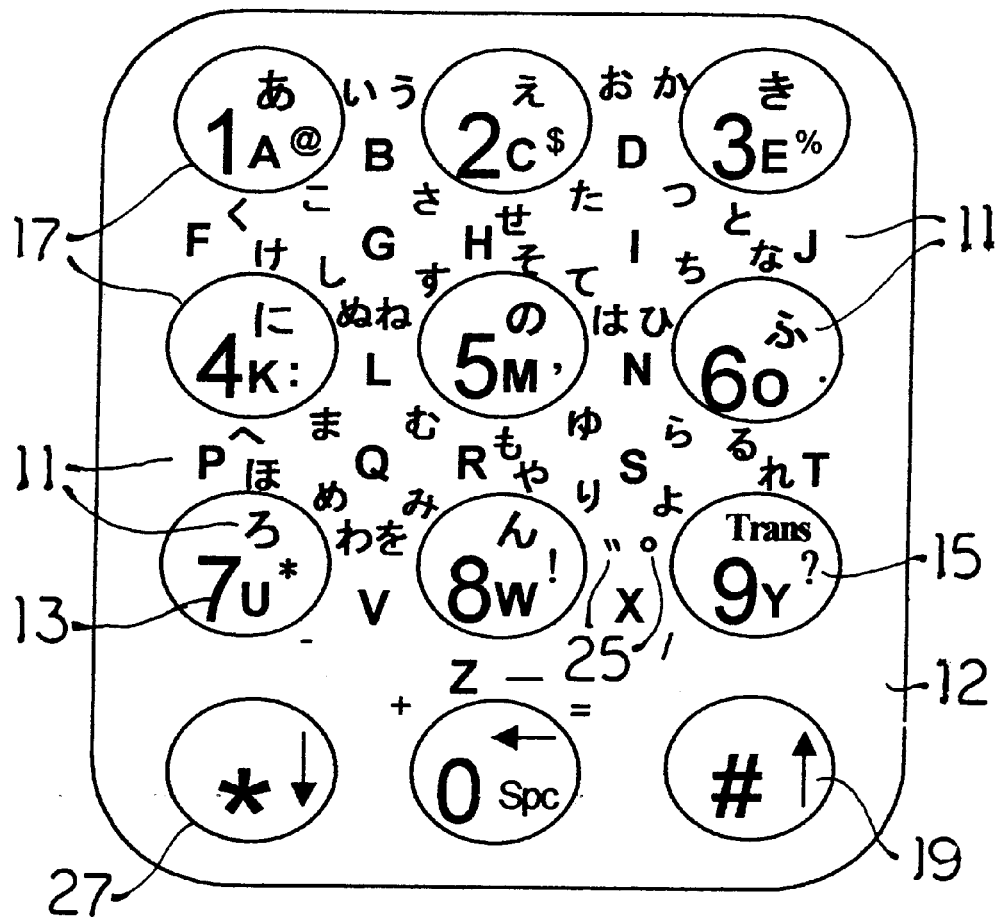
FIG. 8 is a graphic representation of a keypad for use by a telephone in accordance with the principles relating to the present invention possessing twelve keys in standard configuration with visual depictions of the numerics 0–9 and '*' and '#' upon the keys with English alphabetic characters located singly upon and between the keys, Japanese alphabetic characters, punctuation marks, and symbols located singly upon and in sequential pairs between the keys.

FIG. 8 depicts a keypad 12 for an alphabetic telephone in accordance with the principles relating to the present invention which is similar in almost all respects to the keypad 12 depicted in FIG. 7 except with regard to the second set of alphabetic characters 11, which are Japanese, alongside the English. There are forty-six basic alphabetic characters 11 in Japanese plus voiced and half voiced, to which quotation marks and degree symbols, respectively, are added in superscript. All forty-eight of these alphabetic characters 11 and symbols 19 are arranged upon the keypad depicted in FIG. 8. The Japanese alphabetic characters 11 found in pairs between numeric keys 17 are obtained with sequentially paired keystrokes of those keys preferably in order determined by proximity of the numeric keys 17 to each character 11. The punctuation marks 15 and symbols 25 found on top of a numeric key 17 are obtained with double keystrokes of that numeric key 17 in either an English or Japanese mode.

Perhaps most significantly, with respect to the differences between FIG. 8 and the previous figures attached hereto including FIG. 7, it will be seen that the numeric key 17 bearing the numeric 13 '9' also possesses, instead of the Japanese alphabetic character 11 seen upon each of the numeric keys 17 bearing the numerics 13 '1' through '8', the legend 'Trans'. To maximize typing speed it is suggested that the most frequently used English or Japanese alphabetic characters 11 each be located upon a numeric key 17 and be obtainable with a single key stroke in the appropriate mode. This method of arrangement can be applied to the other keypads 12 discussed above and to any keypad 12 for an alphabetic telephone in accordance with the principles relating to the present invention.

The 'Trans' legend signifies, in the particular case depicted in FIG. 8, a function obtained with a single keystroke in an appropriate mode which relates to the two types of Japanese alphabetic characters 11 utilized in that language which might be provided with a separate function key as might the selection of either English or Japanese. One set of Japanese characters 11 is borrowed from ancient China and the other set is utilized for translation from English. There is a correspondence between pairs of Japanese alphabetic characters 11 each possessing the same pronunciation with one of each pair belonging to one of these two sets. There is also a need in Japanese for subscripts to obtain compound sounds resulting from Japanese alphabetic characters 11 used in subscript. At least one other function key, not shown, is considered desirable for obtaining subscript in Japanese. The punctuation mark 15 '〃' and the degree symbol 25 '°' in FIG. 8 are superscripts which change the pronunciation of certain Japanese alphabetic characters 11.

Figure 9:
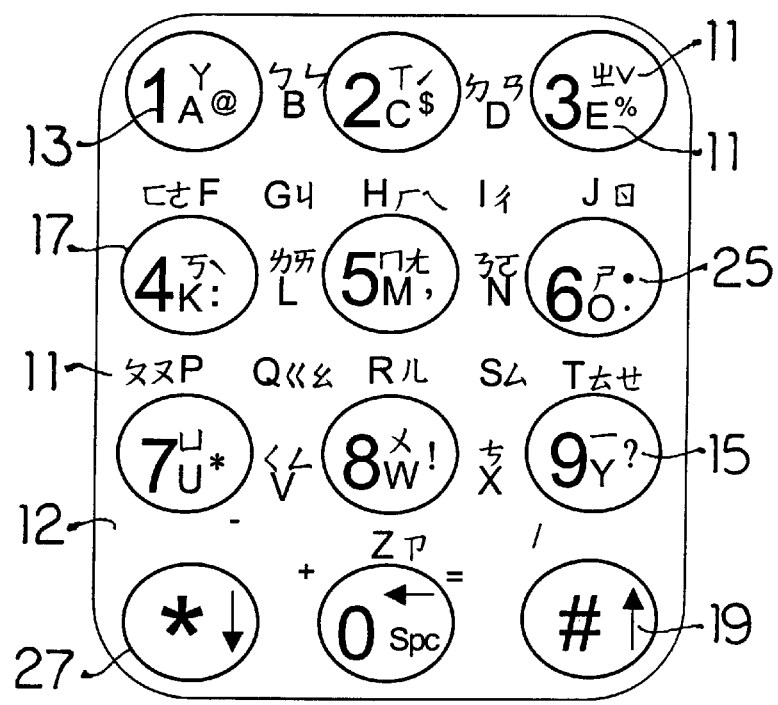
FIG. 9 is a graphic representation of a keypad similar to FIG. 7 but with tighter groupings of alphabetic characters of both languages proximate a numeric key.
Figure 10:
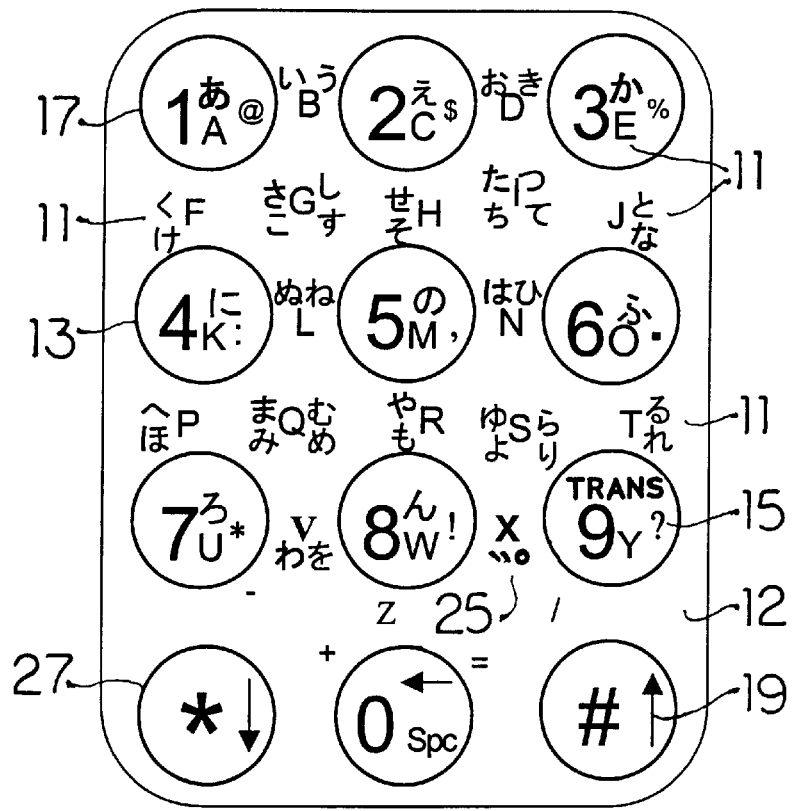
FIG. 10 is a graphic representation of a keypad similar to FIG. 8 but with tighter groupings of alphabetic characters of both languages proximate a numeric key.

FIGS. 9 & 10 depict nearly the same keyboards 12 as shown in FIGS. 7 & 8 with the first of either pair possessing Chinese alphabetic characters 11 in addition to English alphabetic characters 11 and the second possessing Japanese alphabetic characters 11 in addition to English alphabetic characters 11. There is, however, an important difference in appearance which relates to function. The groupings of the alphabetic characters 11 are much tighter in FIGS. 9 & 10.

The two keypads 12 depicted in FIGS. 7 & 9 both utilize the same keystroke sequences to generate the same alphabetic characters 11, numerics 13, punctuation marks 15, and the asterisk and pound, or '*' and '#', function keys 27 as well as the backspace, space, et cetera, all operate in the same exact manner in a preferred embodiment of the principles according to the present invention. Similarly, the two keypads 12 depicted in FIGS. 8 & 10 both utilize the same keystroke sequences to generate the same alphabetic characters 11, numerics 13, punctuation marks 15, and the asterisk and pound, or '*' and '#', function keys 27 as well as the backspace, space, et cetera, all similarly operate in the same exact manner. But it may readily been seen in a visual comparison of the keypad 12 depicted in FIG. 7 with that depicted in FIG. 9, or of the keypad 12 depicted in FIG. 8 with that depicted in FIG. 10, that the second of each pair is much cleaner or less cluttered than the first because the groupings of the otherwise identical alphabetic characters 11 are much tighter.

This tighter grouping of alphabetic characters 11, of one or more Chinese or Japanese with an English alphabetic character 11, facilitates distinguishment of which numeric key 17 is struck first in a sequence. With a tighter grouping the arrangement of the alpabetic characters 11 in relation to the numeric key 17 struck first is more easily discerned. The keyboards 12 depicted in FIGS. 9 & 10 are considered easier to read than the keyboards 12 depicted in FIGS. 7 & 8. A number of related but different rules or principles are observed in this. The association of certain Chinese or Japanese alphabetic characters 11 with an English character 11 is more obvious because the two sets of alphabetic characters 11 are more clearly separated into groups associated with the same numeric key 17. It is preferred that the association of alphabetic characters 11 of the two different language sets be phonetic and the tighter groups emphasize this association which is considered beneficial to learning the keyboard 12 in a second language.

It will also be noticed that each set of alphabetic characters 11 particular to one of the two different languages concerned possesses a consistent disposition with regard to location in relation to a numeric key 17 and to the other set. In the keypads 12 depicted in FIGS. 9 & 10 the English alphabetic characters 11 are generally located interiorly with respect to the Chinese and Japanese alphabetic characters 11 within a given group comprised of both sets.

This is most evident in FIG. 10 as there are more Japanese characters 11 in many of the groups. The English alphabetic characters 'G', 'I', 'Q', and 'S' are all surrounded by four different Japanese alphabetic characters 11 in the keyboard depicted in FIG. 10. While the groups comprised of alphabetic characters 11 taken from two different languages are more tightly organized in FIGS. 9 & 10 in comparison with the keypads 12 depicted in FIGS. 7 & 8 this internal organization, with respect to each group, of the two sets of alphabetic characters facilitates the determination of which numeric keys 17 are struck first in the required sequence and facilitates visual recognition and learning of the location of the alphabetic characters 11.

This manner of arrangement or organization is further facilitated by the use of different colors for the two sets of alphabetic characters 11. While this is not apparent from the black and white drawings attached hereto it is readily understood that if all the Chinese alphabetic characters 11 in FIG. 9 are in a color different than that utilized for the English alphabetic characters 11 the keypad 12 will be easier to read in either language. This is also true and also preferred for the keypad 12 depicted in FIG. 10 wherein the Japanese characters 11, in addition to being consistently arranged about or outside of the interiorly disposed English alphabetic characters 11, are preferably all of a color which is different than that utilized for the English alphabetic characters 11.

It is also preferred that the symbols 15 utilized for subscripts and superscripts in Japanese, and the 'TRANS' which effects a shift between the two types of Japanese alphabetic characters 11, all be in the same color as the Japanese alphabetic characters 11 and of a different from the color utilized for the English alphabetic characters 11 and the other punctuation marks 15, directional, 19 and other symbols 25. And a third color may be desirable to differentiate the two types of Japanese alphabetic characters 11 wherein one color is utilized for English, a second for Japanese based upon ancient Chinese, and a third for Japanese alphabetic characters 11 utilized for translation into English. It is emphasized that the use of different colors must be consistent with regard to the set of alphabetic characters 11 concerned and therefore the function achieved by the use of different colors is essentially the same as the consistent internal organization of different sets of alphabetic characters 11 grouped together in relation to the numeric keys 17 struck in achieving the same.

An underlying guiding principle throughout much of the proceeding discussion is to facilitate visual recognition of the relation between the alphabetic character 11 desired and the sequence of numeric keys 17 required to generate the same upon an otherwise conventionally configured twelve key telephonic keypad operable in a conventional manner in the generation of numerics 13. This visual recognition facilitates the generation of alphabetic characters 11 which facilitates the sending of messages comprised of words and which further facilitates the retrieval of telephone numbers in an address directory 36 organized by names 37 which are considered fundamental. Not only are names 37 easier to recognize than telephone numbers but names 37 also generally change less frequently than telephone numbers and each name 37 may have more than one telephone number associated with the same. It is considered that many people now utilize several 'telephone' numbers, for a stationary telephone, for a stationary facsimile, for a mobile or cellular phone or pager, for e-mail, et cetera, and it is not feasible to organize this information by any other means other than by name 37.

It is lastly emphasized that the above discussion is intended to provide the best manner of making and using a preferred embodiment in accordance with the principles relating to the present invention and is not to be interpreted in any manner as restrictive of said invention or of the rights and privileges secured by Letters Patent for which I claim:

1. A telephone, intended to enable alphabetic character generation in addition to numeric input in facilitation of repertory dialing and the creation of messages for transmission, said telephone comprising:

a twelve key keypad, a visual display screen, function keys, dynamic memory, and microprocessor based control operatively connecting said keypad, screen, and memory;

said keypad possessing a conventional configuration of ten numeric and two function keys and being operable in a conventional manner, wherein single strokes of each of said ten numeric keys obtains one of the numerics '0'–'9' in generation of a telephone number, and being operable in another manner wherein dual keystrokes of said numeric keys obtain alphabetic characters;

said microprocessor based control including an algorithm setting a time threshold compared with the time interval between successive keystrokes and distinguishing single keystrokes over dual keystrokes by recognizing that said time interval exceeds said time threshold;

said screen being operably connected through said microprocessor based control to said keypad to visually display, in response to generation of at least one alphabetic character with said keypad, an alphabetically related portion of an address directory stored in said dynamic memory comprised of alphabetic character names each associated with a telephone number;

at least one said function key being operatively connected to said microprocessor based control to enable selection of one said alphabetic character name displayed upon said screen for initiation of telephonic transmission utilizing the associated telephone number at least one said function key being operatively connected to said microprocessor based control to enable addition of alphabetic character names each in association with a telephone number to said address directory with generation of alphabetic characters utilizing said keypad;

whereby an address directory including alphabetic character names each associated with a telephone number can be stored in memory and a specific telephone number can be selected for automatic dialing with generation of alphabetic characters relating to a name generated with a twelve key keypad of conventional configuration without using more than two keystrokes for the generation of any given alphabetic character.

2. A telephone in accordance with claim 1 wherein said function keys are encompassed by said twelve key keypad.

3. A telephone in accordance with claim 2 wherein at least one of said function keys is operable in movement of a cursor upon said screen.

4. A telephone in accordance with claim 1 wherein dual keystrokes in obtainment of an alphabetic character include double keystrokes of each of a plurality of said numeric keys by which the numerics '0'–'9' are obtained with a single stroke.

5. A telephone in accordance with claim 4 wherein the alphabetic character obtained by a double keystroke of a particular numeric key is visually depicted upon that numeric key.

6. A telephone in accordance with claim 1 wherein dual keystrokes in obtainment of an alphabetic character include paired keystrokes of two of said numeric keys by which the numerics '0'–'9' are obtained with a single stroke.

7. A telephone in accordance with claim 6 wherein the order in which said two numeric keys is stroked in a paired keystroke in obtainment of an alphabetic character is immaterial to the single alphabetic character obtained by the paired keystroke.

8. A telephone in accordance with claim 7 wherein the single alphabetic character obtained by a paired keystroke is visually depicted upon said keypad between said two numeric keys.

9. A telephone in accordance with claim 7 wherein the single alphabetic character obtained by the paired keystroke is visually depicted upon said keypad and located equidistantly between said two numeric keys.

10. A telephone in accordance with claim 1 wherein dual keystrokes in obtainment of an alphabetic character include sequentially paired keystrokes of two of said numeric keys wherein the order in which said two numeric keys are stroked in obtainment of an alphabetic character determines which of two different alphabetic characters are generated.

11. A telephone in accordance with claim 10 wherein both the alphabetic characters obtained by a sequentially paired keystroke are visually depicted upon said keypad between said two numeric keys.

12. A telephone in accordance with claim 11 wherein each of said alphabetic characters obtained by a sequentially paired keystroke is visually depicted upon said keypad in a location proximate one numeric key in comparison with the other numeric key.

13. A telephone in accordance with claim 12 wherein each of said alphabetic characters obtained by a sequentially paired keystroke is obtained by stroking the numeric key proximate the visual depiction of that alphabetic character first and the other numeric key second.

14. A telephone in accordance with claim 1 wherein all twenty-six alphabetic characters of the English langauge are visually depicted upon said keypad and obtainable without using more than two keystrokes for the generation of any given alphabetic character.

15. A telephone in accordance with claim 14 wherein, in addition to all twenty-six characters of the English language, a plurality of punctuation symbols are visually depicted upon said keypad each obtainable without using more than two keystrokes for the generation of any given alphabetic character.

16. A telephone in accordance with claim 15 wherein said plurality of punctuation symbols visually depicted upon said keypad are each obtained with a double keystroke of a single key.

17. A telephone in accordance with claim 14 further possessing, in addition to all twenty-six alphabetic characters of the English language, all forty-six alphabetic characters of the Japanese language each visually depicted upon said keypad and each obtainable without using more than two keystrokes for the generation of any given alphabetic character.

18. A telephone in accordance with claim 17 wherein alphabetic characters of the Japanese language are obtained with use of sequentially paired keystrokes.

19. A telephone in accordance with claim 17 wherein alphabetic characters of the English language are obtained without use of sequentially paired keystrokes.

20. A telephone in accordance with claim 14 further possessing, in addition to all twenty-six alphabetic characters of the English language, all forty-two alphabetic characters of the Chinese language each visually depicted upon said keypad and each obtainable without using more than two keystrokes for the generation of any given alphabetic character.

21. A telephone in accordance with claim 20 wherein alphabetic characters of the English language are obtained without use of sequentially paired keystrokes.

22. A telephone in accordance with claim 20 herein said forty-two alphabetic characters of the Chinese language are arranged in phonetic groups each comprised of no more than two characters wherein each said phonetic group is associated with an alphabetic character of the English language.

23. A telephone in accordance with claim 22 wherein alphabetic characters of the Chinese language are obtained without use of sequentially paired keystrokes.

24. A telephone in accordance with claim 1 possessing a set of alphabetic characters taken from one language and an other set of alphabetic characters taken from an other language both depicted upon said keypad in groups each comprised of at least one alphabetic letter taken from said one language and at least one alphabetic character taken from said other language.

25. A telephone in accordance with claim 24 wherein each said group is located proximate one said numeric key.

26. A telephone in accordance with claim 24 wherein a plurality of said groups is each comprised of alphabetic characters possessing phonetic similarity.

27. A telephone in accordance with claim 24 wherein a plurality of said groups is each comprised of at least one alphabetic letter taken from said one language located in a consistent relation with respect to at least one said alphabetic character taken from said other language.

28. A telephone in accordance with claim 24 wherein said alphabetic letters taken from said one language are depicted in one color and said alphabetic characters taken from said other language are depicted in an other color.

29. A telephone in accordance with claim 24 wherein said one language is English.

\* \* \* \* \*